United States Patent [19]
Fukushima

[11] Patent Number: 5,307,257
[45] Date of Patent: Apr. 26, 1994

[54] TRANSFORMERLESS POWER-SUPPLY UNIT FOR SUPPLYING A LOW DC VOLTAGE

[75] Inventor: Yoshio Fukushima, Mino, Japan

[73] Assignee: Matsushita Electric Industrial Co., Ltd., Kadoma, Japan

[21] Appl. No.: 839,430

[22] Filed: Feb. 21, 1993

[30] Foreign Application Priority Data

| Feb. 22, 1991 | [JP] | Japan | 3-028540 |
| Feb. 25, 1991 | [JP] | Japan | 3-030038 |
| Feb. 26, 1991 | [JP] | Japan | 3-030633 |
| Feb. 27, 1991 | [JP] | Japan | 3-032664 |
| Jul. 17, 1991 | [JP] | Japan | 3-176694 |

[51] Int. Cl.$^5$ .................. H02M 7/21; H02M 7/06
[52] U.S. Cl. .................. 363/53; 323/300; 363/81; 363/89
[58] Field of Search .......... 323/299, 300; 363/84, 363/86, 89, 81, 53; H02M 7/21, 7/217; G05F 5/00, 5.02, 7/06

[56] References Cited

U.S. PATENT DOCUMENTS

| 3,697,861 | 10/1972 | Frazier . |
| 3,947,752 | 3/1976 | Morgan . |
| 4,001,668 | 1/1977 | Lewis ............................. 363/89 |
| 4,685,046 | 8/1987 | Sanders ......................... 363/89 |

FOREIGN PATENT DOCUMENTS

| 0106041 | 4/1984 | European Pat. Off. .... H02M 7/217 |
| 327174 | 8/1989 | European Pat. Off. . |
| 3245238 | 6/1984 | Fed. Rep. of Germany ......... H02M 7/217 |
| 3304759 | 8/1984 | Fed. Rep. of Germany ........ 363/89 |
| 173673 | 8/1986 | Japan . |
| 62-135274 | 6/1987 | Japan ........................... H02M 7/06 |
| WO83/01694 | 5/1983 | PCT Int'l Appl. .................. 363/86 |
| 1651348 | 5/1991 | U.S.S.R. ........................ H02M 7/06 |
| 0249259 | 12/1987 | United Kingdom ........ H02M 3/156 |
| 2203003 | 10/1988 | United Kingdom . |
| 0399598 | 11/1990 | United Kingdom ........ H02M 7/219 |

OTHER PUBLICATIONS

"Power Supplies", Machine Design, vol. 62 (1990) Jun., No. 11, pp. 474–485.

*Primary Examiner*—William H. Beha, Jr.
*Attorney, Agent, or Firm*—Cushman, Darby & Cushman

[57] ABSTRACT

A power-supply unit having a rectifier circuit, switch, first and second voltage generation circuits, a control circuit, and a capacitor. The rectifier circuit is connected to an A.C. power source. The switch opens/closes an electric line which supplies a load circuit with electric power from the A.C. power source via the rectifier circuit. The first voltage generation circuit generates a first voltage based on an output voltage of the rectifier circuit. The first voltage is a non-zero voltage. The second voltage generation circuit generates a second voltage based on the output voltage, and is larger than the first voltage. The control circuit turns the switch on when the output voltage is in a range between the first voltage and the second voltage, and turns the switch off when the output voltage is outside the range. The capacitor is charged with electricity by the output voltage when the output voltage is in the range, and supplies the load circuit with electric power when the output voltage is outside the range.

11 Claims, 10 Drawing Sheets

TRANSFORMERLESS POWER-SUPPLY UNIT FOR SUPPLYING A LOW DC VOLTAGE

FIELD OF THE INVENTION AND RELATED ART STATEMENT

1. Field of the Invention

The present invention relates to a power-supply unit for an electrical appliance such as a cooked-rice container for keeping rice warm, a rice boiler, an iron, a vacuum-cleaner or the like in which an electronic circuit is not isolated from a commercial power source.

2. Description of the Related Art

In recent years, domestic electrical appliances generally have an electronic circuit including an active element, such as CPU. In such an appliance, an internal circuit generally consists of a power source circuit and some electronic circuits. For convenience' sake, the commercial power source is referred to as "primary circuit" hereinafter.

FIG. 10 is a circuit diagram showing a known circuit combined with the conventional primary circuit and an electronic circuit. In FIG. 10, an auto-transformer 21 is connected to an A.C. power source 1 so that a voltage of the A.C. power source is adjusted into a predetermined value. A pair of rectifiers 22 are connected to the secondary side of the auto-transformer 21. One end of a capacitor 23 is connected to a positive line 24 and the other end thereof is connected to a negative line 25. An electronic circuit 8, which is a load, is connected in parallel with the capacitor 23.

Next, operation of the above-mentioned conventional power-supply unit is described.

A.C. voltage of the A.C. power source 1 is reduced to an appropriate voltage by the auto-transformer 21. This step-down voltage is rectified by the rectifiers 22 and is smoothed by the capacitor 23. D.C. output voltage is dependent on a secondary voltage of an auto-transformer 21.

However, since the above-mentioned power-supply unit has the transformed 21, there exist unavoidable shortcomings. For example, many electric components and much material are necessary; the cost of production is high; it is not easy to lower the price; the unit is heavy and large; efficiency is not very good; heat loss is great.

OBJECT AND SUMMARY OF THE INVENTION

An object of the present invention is to offer a power-supply unit which can efficiently supply a load with electric power without using a transformer.

In order to achieve the above-mentioned object, the power-supply unit of the present invention comprises:

a rectifier circuit connected to an A.C. power source;

switching means for opening/closing an electric line which supplies a load circuit with electric power from the A.C. power source via the rectifier circuit;

a first voltage generation circuit for generating a first voltage based on an output voltage of the rectifier circuit;

a second voltage generation circuit for generating a second voltage based on the output voltage and larger than the first voltage;

a control circuit for making the switching means on when the output voltage is in a range between the first voltage and the second voltage and making the switching means off when the output voltage is outside the range; and a capacitor which is charged with electricity by the output voltage when the output voltage is in the range and supplies the load circuit with electric power when the output voltage is outside the range.

According to the present invention, the power-supply unit can be constructed only by electronic circuits without use of a transformer. Therefore, size, weight, cost and heat loss can be much decreased.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Hereafter, preferred embodiments of the present invention are described with reference to the accompanying drawings.

Figure 1:
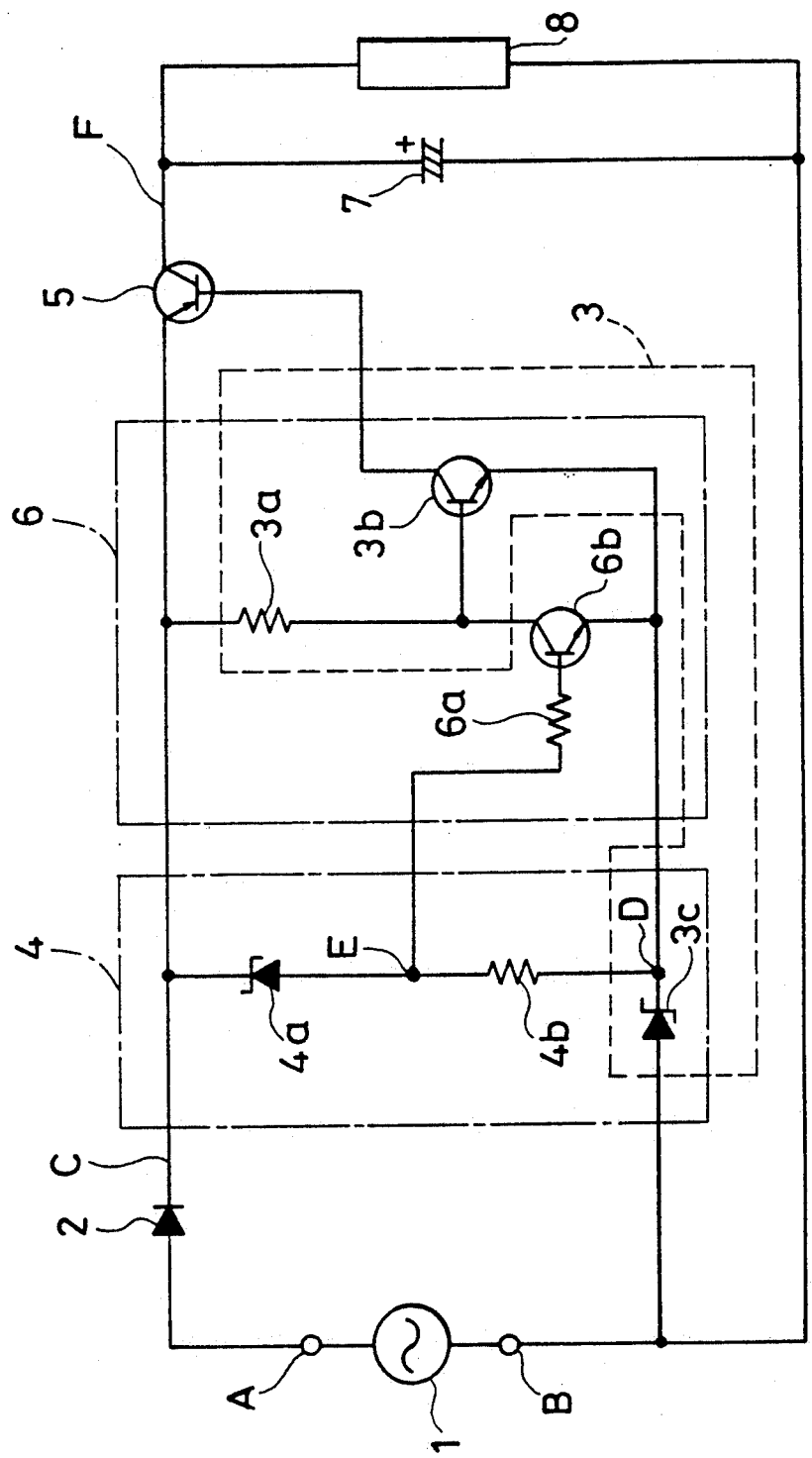
FIG. 1 is a circuit diagram showing a power-supply unit of the first embodiment in the present invention.

FIG. 1 is a circuit diagram showing a first embodiment of the present invention. A rectifier 2 is connected to a terminal A of a commercial A.C. power source 1, thereby forming a positive half-wave rectifier circuit. A first reference-voltage generation circuit 3 consists of a resistor 3a, a transistor 3b and a Zener diode 3c. One end of the resistor 3a is connected to a line C, which is an output end of the rectifier 2, and the other end of the resistor 3a is connected to the base of the transistor 3b. The emitter of the transistor 3b is connected to the cathode of the Zener diode 3c, and the anode of the Zener diode 3c is connected to a terminal B of the A.C. power source 1. A first reference voltage is generated at a point D, which is the cathode of the Zener diode 3c, by a current flowing through the resistor 3a, base-emitter of the transistor 3b and the Zener diode 3c.

A second reference voltage generation circuit 4 consists of a Zener diode 4a, a resistor 4b and the Zener diode 3c. The cathode of the Zener diode 4a is connected to the line C which is the output end of the rectifier 2. One end of the resistor 4b is connected to the anode of the Zener diode 4a, and the other end of the resistor 4b is connected to the point D which is the cathode of the Zener diode 3c. A junction E of the Zener diode 4a and the resistor 4b acts as an output point of the second reference voltage generation circuit 4, and its output voltage is a sum of operating voltage of the Zener diode 3c and the Zener diode 4a. Power supply to a capacitor 7 and a load 8 is controlled by switch 5 which is in the concrete a transistor in this embodiment. Hereafter, the switch 5 is referred to as the transistor 5. By making the base current on or off, the transistor 5 turns on or off, thereby acting as a switch.

A control circuit 6 consists of a resistor 6a, a transistor 6b, the resistor 3a and the transistor 3b. This control circuit 6 receives output of the first reference voltage generation circuit 3 and the second reference voltage generation circuit 4 and controls the transistor 5. One end of the resistor 6a is connected to the output point E of the second reference voltage generation circuit 4, and the other end of the resistor 6a is connected to the base of the transistor 6b. The emitter of the transistor 6b is connected to the emitter of the transistor 3b, and the collector of the transistor 6b is connected to the resistor 3a and the base of the transistor 3b. An output voltage of the control circuit 6 arises at the collector of the transistor 3b, and this collector is connected to the base of the transistor 5. A capacitor 7 is impressed with a D.C. voltage developed between the collector of the transistor 5 and the terminal B. The load 8, which is connected in parallel with the capacitor 7, is generally an electronic circuit such as a constant-voltage circuit.

Next, operation of the above-mentioned circuit of the first embodiment of FIG. 1 is described.

The first reference voltage generation circuit 3 is not operated by the time when the output voltage of the rectifier 2 reaches the first reference voltage, which is the operating voltage of the Zener diode 3c constituting the first reference voltage generation circuit 3, from zero volt. For simplicity of explanation, an operating voltage (approx. 0.6 v) of the transistor 3b is disregarded, and each operating voltage (approx. 0.6 v) of all the transistors will be disregarded hereafter. When a voltage on the line C reaches the operating voltage of the Zener diode 3c, the transistor 3b turns on from off, and thereby current flows from the emitter of the transistor 5 to the Zener diode 3c through the base of the transistor 5, the collector of the transistor 3b and the emitter of the transistor 3b. The transistor 5 thereby turns on. When the voltage on the line C increases further and reaches the second reference voltage, which is a sum of operating voltages of two Zener diodes 3c and 4a, the transistor 6b turns on through a bias resistance of the resistor 6a. As a result of turning-on of the transistor 6b, current flows from the resistor 3a to the emitter of the transistor 6b, and thereby the collector and the emitter of the transistor 6b have substantially equal potentials to each other. The transistor 3b thereby turns off, and the transistor 5 turns off. Subsequently, the voltage on the line C increases further up to the peak voltage. Upon arrival of the peak values, the voltage begins to decrease. When the voltage reaches the second reference voltage again, the transistor 5 turns on and its on-state is held until the voltage on the line C reaches the first reference voltage. When the voltage reaches the first reference voltage, the transistor 3b turns off, and thereby the transistor 5 turns off. During an on-period of the transistor 5, the capacitor 7 is being charged and an electric power is being supplied to the load 8 at the same time. During an off-period the transistor 5, the capacitor 7 acts as a power source which supplies the load with charged electric power.

As has been stated above, the transistor 5 is on during the voltage on the line C is in a range between the first reference voltage and the second reference voltage, thereby supplying the capacitor 7 and the load 8 with electric power.

Figure 2:
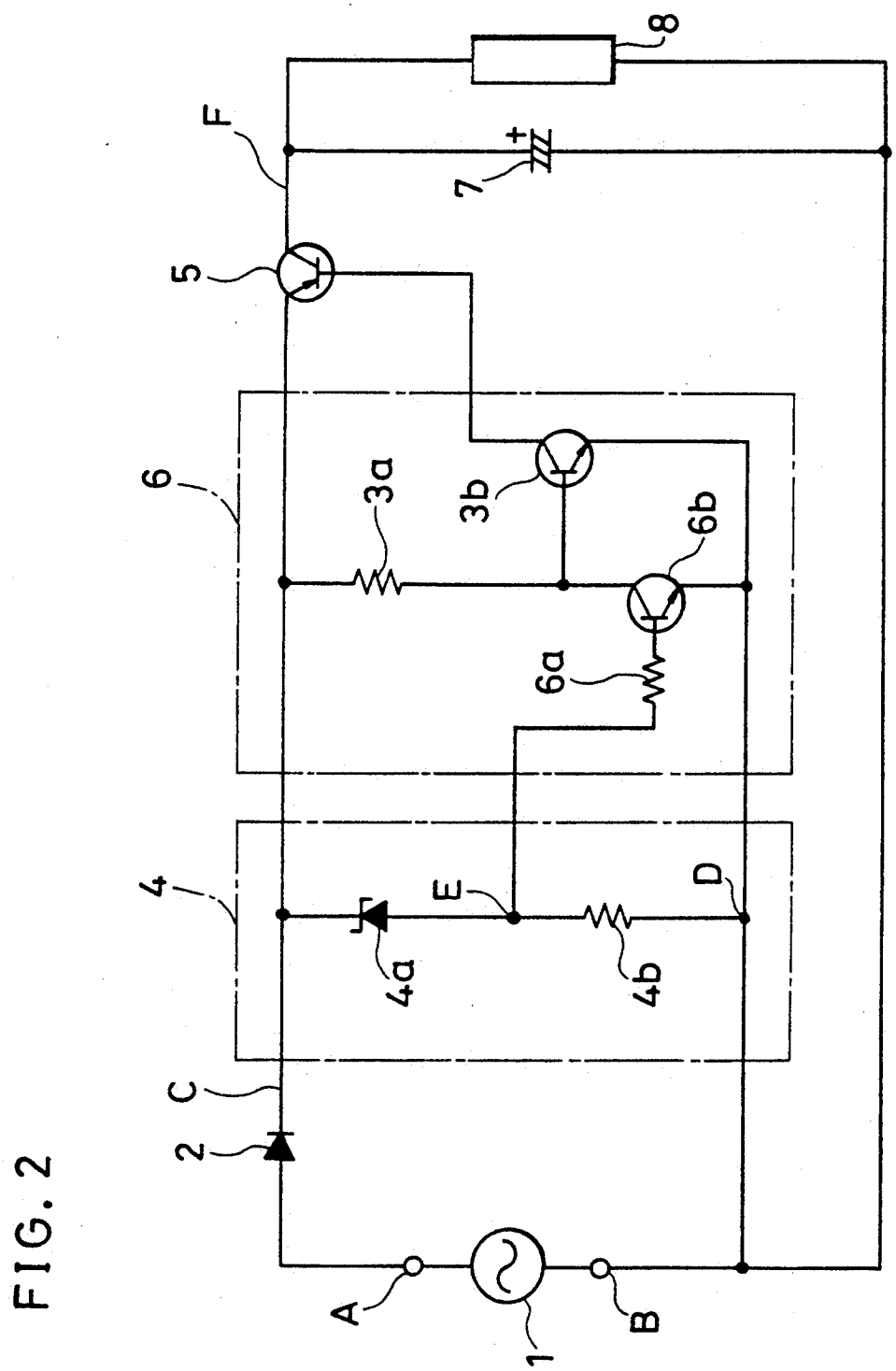
FIG. 2 is a circuit diagram showing a power-supply unit of the second embodiment in the present invention.

Next, a second embodiment of the present invention is described. FIG. 2 is a circuit diagram showing the power-supply unit of the second embodiment. Corresponding parts and components to the first embodiment are shown by the same numerals and marks, and the description thereon made in the first embodiment similarly applies. The circuit of this second embodiment is equivalent to a circuit which is obtained by short-circuiting the Zener diode 3c of FIG. 1.

Hereafter, operation of the second embodiment is described.

In the first embodiment, the first reference voltage of the first reference voltage generation circuit 3 is the operating voltage of the Zener diode 3c, whereas in the second embodiment the first reference voltage is zero volt. Therefore, the circuit of FIG. 2 is equivalent to the circuit of FIG. 1 in which the Zener diode 3c is shortcircuited. Therefore, the transistor 5 turns on at the time when the voltage on the line C is still zero volt. This is not actually zero volt but approx. 0.6 volt which is an on-voltage of the transistor 3b. However, since the on-voltage of a transistor is disregarded as has been described, it may be expressed that the transistor 5 turns on from "zero volt". Operation of the circuit is similar to that of the circuit of FIG. 1 except that the first reference voltage is zero-volt.

Figure 3:
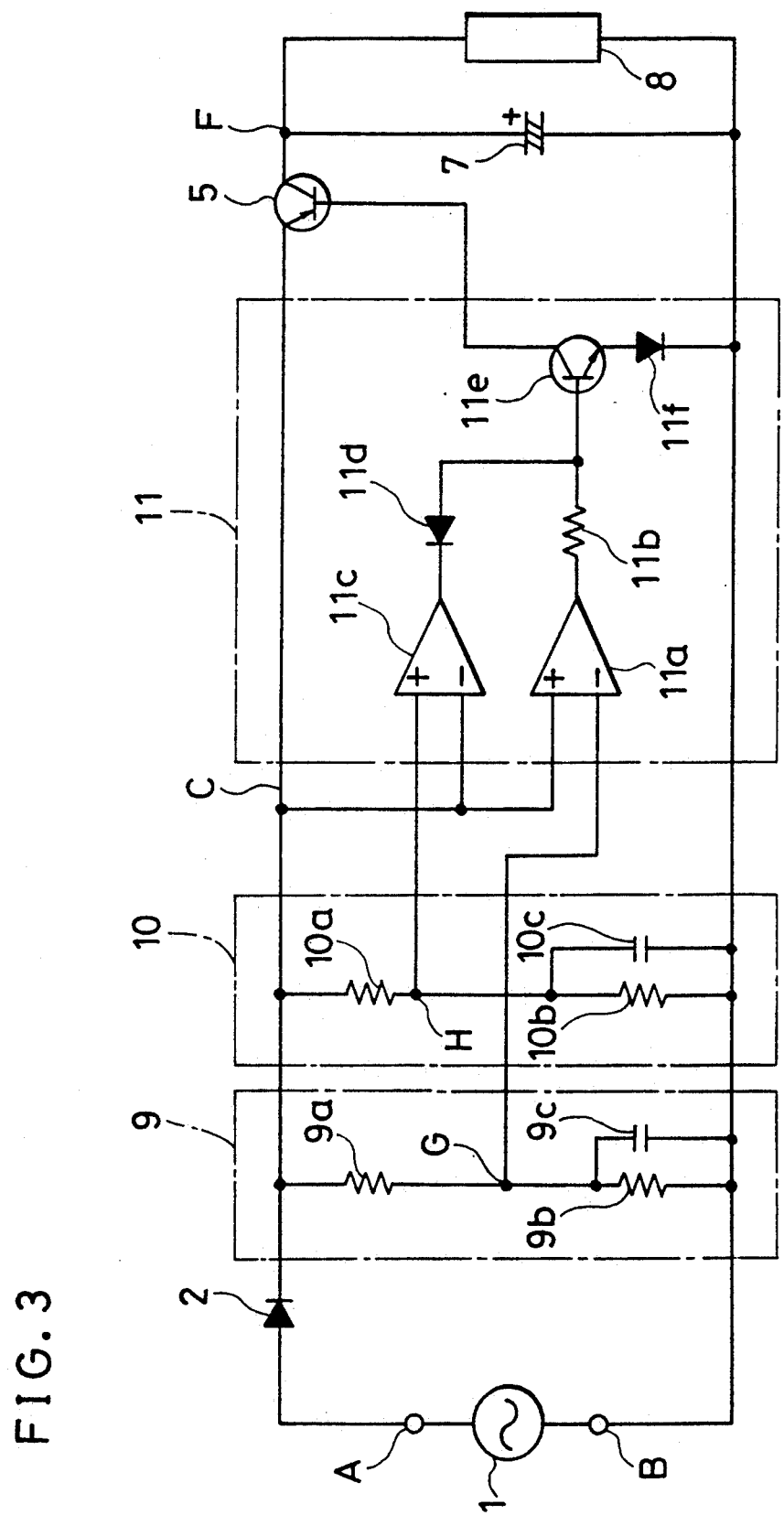
FIG. 3 is a circuit diagram showing a power-supply unit of the third embodiment in the present invention.

Next, a third embodiment of the present invention is described. FIG. 3 is a circuit diagram showing the third embodiment. Corresponding parts and components to the first embodiment are shown by the same numerals and marks, and the description thereon made in the first embodiment similarly applies. A first phase-angle voltage generation circuit 9, which generates a voltage corresponding to a specific phase angle of the A.C. power source, consists of resistors 9a, 9b and a capacitor 9c. One end of the resistor 9a is connected to the line C which is an output end of the rectifier 2, and the other end of the resistor 9a is connected to each one end of the resistor 9b and the capacitor 9c which are connected in parallel with each other. The other end of the resistor 9b and the other end of the capacitor 9c are connected to the terminal B of the A.C. power source 1.

An output voltage of the first phase-angle voltage generation circuit 9 is issued at a junction (output point) G of the resistors 9a and 9b. A second phase-angle voltage generation circuit 10 consists of resistors 10a, 10b and a capacitor 10c. One end of the resistor 10a is connected to the line C, and the other end of the resistor 10a is connected to each one end of the resistor 10b and the capacitor 10c which are connected in parallel with each other. The other end of the resistor 10b and the other end of the capacitor 10c are connected to the terminal B of the A.C. power source 1.

An output voltage of the second phase-angle voltage generation circuit 10 is issued at a junction (output point) H of the resistors 10a and 10b. A control circuit 11 consists of comparators 11a, 11c, a resistor 11b, diodes 11d, 11f and a transistor 11e. The non-inverted input terminal of the comparator 11a and the inverted input terminal of the comparator 11c are connected in common to the line C. The inverted input terminal of the comparator 11a is connected to the output point G of the first phase-angle voltage generation circuit 9. The non-inverted input terminal of the comparator 11c is connected to the output point H of the second phase-angle voltage generation circuit 10. The output terminal of the comparator 11a is connected to the base of the transistor 11e by way of the resistor 11b. The anode of the diode 11f is connected to the emitter of the transistor 11e, and the cathode of the diode 11f is connected to the terminal B of the A.C. power source 1. The cathode of the diode 11d is connected to the output terminal of the comparator 11c, and the anode of the diode 11d is connected to the base of the transistor 11e. The collector of the transistor 11e, which serves as an output terminal of the control circuit 11, is connected to the base of the transistor 5.

Hereafter, operation of the above-mentioned third embodiment of FIG. 3 is described. In the first phase-angle voltage generation circuit 9, the voltage on the line C is divided by the resistors 9a and 9b, and a voltage developed across the register 9b is held by the capacitor 9c. By this holding effect, the first phase-angle voltage generation circuit 9 generates a voltage which is in proportion to the peak voltage of the output voltage of the rectifier 2. A voltage having a constant ratio to the peak voltage is a voltage corresponding to a specific phase-angle of a frequency of the A.C. power source with respect to the phase of the A.C. power source. Even when the A.C. voltage fluctuates, the first phase-angle voltage generation circuit 9 always generates a constant first phase-angle voltage which corresponds to a specific phase-angle. In the similar way to the above, the second phase-angle voltage generation circuit 10 generates a second phase-angle voltage which corresponds to a second phase-angle of the A.C. power source. When the second phase-angle is made larger than the first phase-angle, the voltage corresponding to the second phase-angle is larger than the voltage corresponding to the first phase-angle.

When an output voltage of the rectifier 2, which is the voltage on the line C, is smaller than the first phase-angle voltage, an output voltage of the comparator 11a is of low level, and an output voltage of the comparator 11c is of high level. However, the transistor 11e does not turn on for the reason of existence of the diode 11d. Therefore, the transistor 5 keeps its off-state. When an output voltage of the rectifier 2 is in a range between the first phase-angle voltage and the second phase-angle voltage, output voltages of the comparators 11a and 11c are both high levels. Therefore, the transistor 11e is on, and thereby the transistor 5 is also on. When an output voltage of the rectifier 2 is larger than the second phase-angle voltage, an output voltage of the comparator 11a is of high level, and an output voltage of the comparator 11c is of low level. At that time, the base voltage of the transistor 11e is approximately 0.6 volt owing to existence of the diode 11d. Therefore, the transistor 11e is off and the transistor 5 is also off. The diode 11f is provided in order to ensure the turning-off of the transistor 11e.

As has been stated above, in the third embodiment the transistor 5 is on at the time when the output voltage of the rectifier 2 is in a range between the voltage corresponding to the first phase-angle and the voltage corresponding to the second phase-angle of the A.C. power source 1, and the transistor 5 is off at the time except the above-mentioned time period for on state. Electric power supply to the capacitor 7 and the load 8 is carried out in the similar way to the first embodiment.

Next, a fourth embodiment of the present invention is described.

Figure 4:
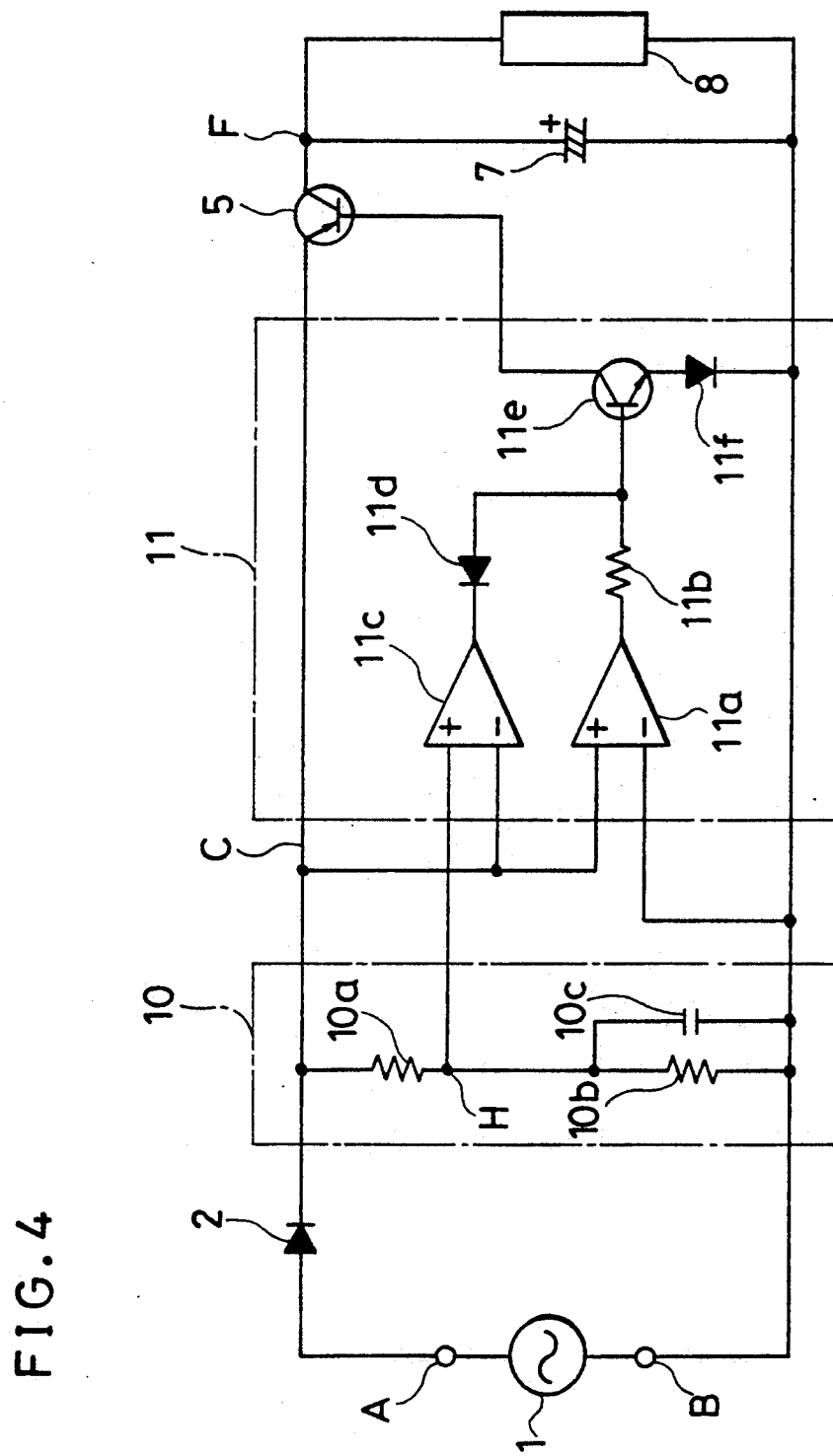
FIG. 4 is a circuit diagram showing a power-supply unit of the fourth embodiment in the present invention.

FIG. 4 is a circuit diagram showing the fourth embodiment. Corresponding parts and components to the third embodiment are shown by the same numerals and marks, and the description thereon made in the third embodiment similarly applies. In this embodiment, the first phase-angle is made zero degree, and a voltage generated at the output end of the rectifier 2 is zero volt at a phase angle of zero degree. This is equivalent to the case that, in FIG. 3, a voltage on the output point G is made zero volt and a resistance of the resistor 9b is made zero ohm. Therefore, an output voltage of the comparator 11a is of high level at the time when the voltage on the line C is larger than zero volt, thereby making the transistor 11e on. Operation of this fourth embodiment is thus similar to that of the third embodiment except that the first phase-angle voltage is zero volt. Incidentally, even when an output end of the comparator 11a, which is connected to the resistor 11b, is connected to the line C, operation is carried out in the similar way to the above on condition that the on-voltage of the base-emitter in the transistor 11e and the forward directional voltage of the diode 11f are both to be disregarded as aforementioned. That is, even when the comparator 11a is disabled, operation itself is not changed.

Figure 5:
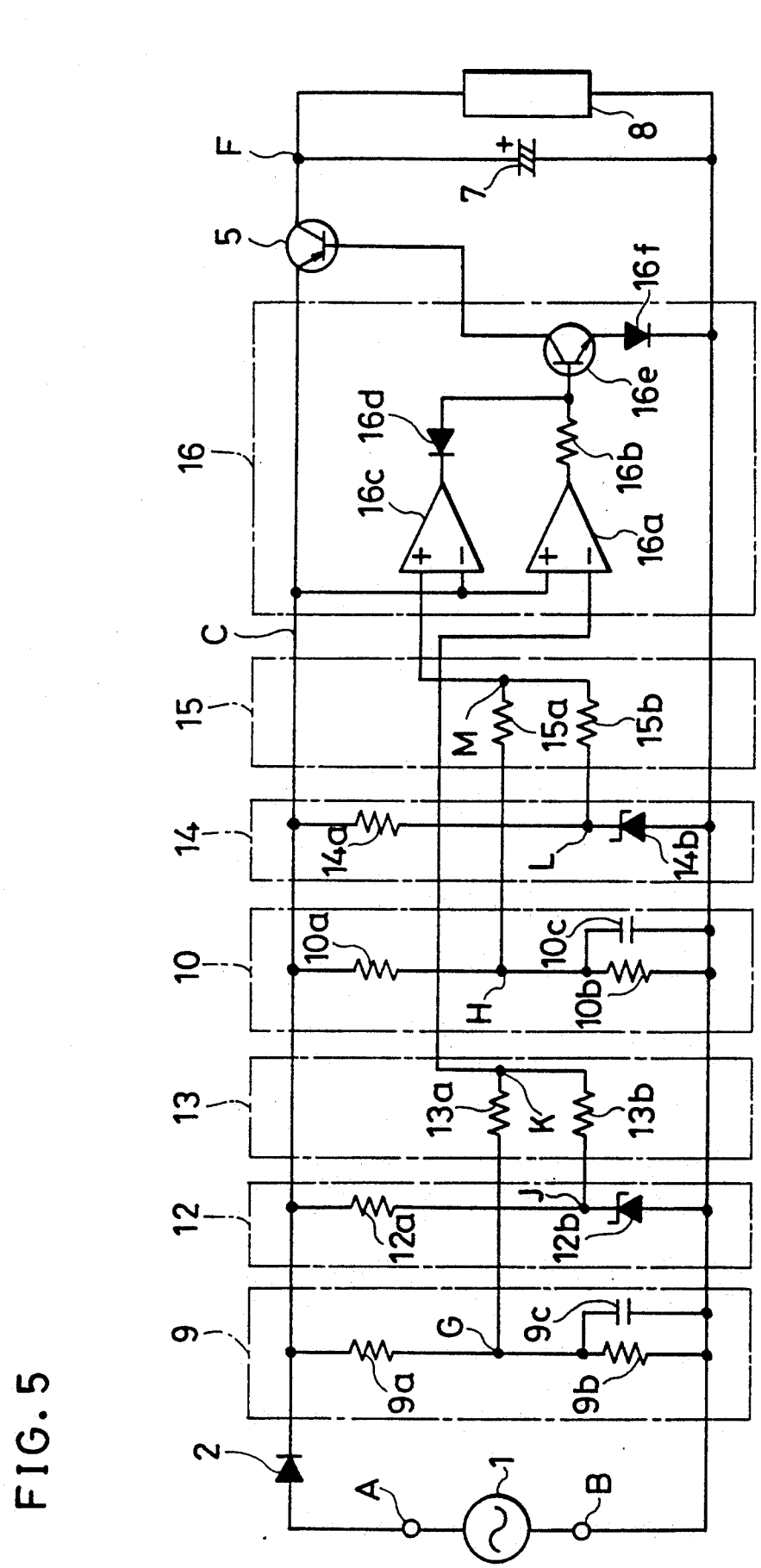
FIG. 5 is a circuit diagram showing a power-supply unit of the fifth embodiment in the present invention.

FIG. 5 is a circuit diagram showing a fifth embodiment of the present invention. Corresponding parts and components to the third embodiment (FIG. 3) are shown by the same numerals and marks, and the description thereon made in the third embodiment similarly applies.

In FIG. 5, a first reference voltage generation circuit 12 consists of a resistor 12a, one end of which is connected to the line C, and a Zener diode 12b connected to the other end of the resistor 12a. The anode of the Zener diode 12b is connected to the terminal B of the A.C. power source 1. A first reference voltage, which is an operating voltage of the Zener diode 12b, is issued from an output point J on the cathode of the Zener diode 12b. A first mixing circuit 13, which consists of a resistor 13a and a resistor 13b, mixes the first reference voltage and the first phase-angle voltage. The output point G of the first phase-angle voltage generation circuit 9 is connected to one end of the resistor 13a, and the output point J of the first reference voltage generation circuit 12 is connected to one end of the resistor 13b. Respective other ends of the resistors 13a and 13b are connected to each other, thereby acting as an output point K of the first mixing circuit 13. A second reference voltage generation circuit 14 consists of a resistor 14a, one end of which is connected to the line C, and a Zener diode 14b connected to the other end of the resistor 14a. The anode of the Zener diode 14b is connected to the terminal B of the A.C. power source 1. A second reference voltage, which is an operating voltage of the Zener diode 14b, is issued from an output point L on the cathode of the Zener diode 14b. A second mixing circuit 15, which consists of resistors 15a and 15b, mixes the second reference voltage with the second phase-angle voltage. One end of the resistor 15a is connected to an output point H of the second phase-angle voltage generation circuit 10, and one end of the resistor 15b is connected to the output point L of the second reference voltage generation circuit 14. Respective other ends of the resistors 15a and 15b are connected to each other, thereby acting as an output point M of the second mixing circuit 15. A third control circuit 16 consists of a comparators 16a, 16c, a resistor 16b, diodes 16d, 16f and a transistor 16e.

The non-inverted input terminal of the comparator 16a and the inverted input terminal of the comparator 16c are connected to the line C. The inverted input terminal of the comparator 16a is connected to the output point K of the first mixing circuit 13. The non-inverted input terminal of the comparator 16c is connected to the output point M of the second mixing circuit 15. The output terminal of the comparator 16a is connected to the base of the transistor 16e by way of the resistor 16b. The anode of the diode 16f is connected to the emitter of the transistor 16e, and the cathode of the diode 16f is connected to the terminal B of the A.C. power source 1. The cathode of the diode 16d is connected to the output terminal of the comparator 16c, and the anode of the diode 16d is connected to the base of the transistor 16e. The collector of the transistor 16e, which serves as an output terminal of the control circuit 16, is connected to the base of the transistor 5.

Hereafter, operation of the fifth embodiment of FIG. 5 is described. The first mixing circuit 13 mixes the first phase-angle voltage with the first reference voltage by means of a specific mixing ratio given by the resistors 13a and 13b, thereby issuing a first mixed voltage. The second mixing circuit 15 mixes the second phase-angle voltage with the second reference voltage by means of a specific mixing ratio given by the resistors 15a and 15b, thereby issuing a second mixed voltage. The first phase-angle voltage is smaller than the second phase-angle voltage, and the first reference voltage is smaller than the second reference voltage. Therefore, the first mixed voltage is smaller than the second mixed voltage. When the voltage on the line C is smaller than the first mixed voltage, an output voltage of the comparator 16a is of low level, and an output voltage of the comparator 16c is of high level. However, the transistor 16e does not turn on owing to existence of the diode 16d. At that time, the transistor 5 keeps its off-state. When the voltage on the line C increases and is in a range between the first mixed voltage and the second mixed voltage, an output voltage of the comparator 16a is of high level, and an output voltage of the comparator 16c is also high level. The transistor 16e is therefore operated, and the transistor 5 keeps on-state when the voltage on the line C is being between the first mixed voltage and the second mixed voltage. Next, when the voltage on the line C increases further and becomes larger than the second mixed voltage, an output voltage of the comparator 16a is of high level, and an output voltage of the comparator 16c is of low level. At that time, the base voltage of the transistor 16e is approximately 0.6 volt owing to existence of the diode 16d, and the transistor 16e is therefore not operated. The transistor 5 is thus off when the voltage on the line C is being larger than the second mixed voltage. The diode 16f is provided in order to ensure the turning-off of the transistor 16e.

As has been stated above, in the fifth embodiment the transistor 5 is on at the time when the output voltage of the rectifier 2 is in the range between the first mixed voltage and the second mixed voltage of the A.C. power source 1, and the transistor 5 is off at the time except the above-mentioned time period for on. Electric power supply to the capacitor 7 and the load 8 is carried out in the similar way to the first embodiment.

In the fifth embodiment, the voltage corresponding to a specific phase-angle was mixed with the reference voltage by means of the specific ratio. However, such a mixing as this may be carried out by means of adding.

To adopt a concept of the "mix" is significant in respect that the voltage supplied to the load 8 is very stable. That is, in the first and second embodiments (FIGS. 1 and 2), since the reference voltage is constant independent of the fluctuation of voltage of the A.C. power source 1, the phase-angle of turning on and/or off of the transistor 5 is changed in response to the fluctuation of voltage. For example, when the voltage of the A.C. power source 1 decreases, an on-time-period of the transistor 5 is elongated, and thereby the voltage supplied to the load 8 increases. In the third and fourth embodiments (FIGS. 3 and 4), although the phase-angle voltage is changed in response to the peak voltage of the A.C. power source 1 so as to keep the phase-angle of turning on and/or off constant, the voltage supplied to the load 8 is changed in response to the peak voltage of the A.C. power source itself. For example, when the voltage of the A.C. power source 1 decreases, the voltage supplied to the load 8 also decreases. Therefore, by mixing the reference voltage with the phase-angle voltage, it is possible to offset their errors.

Figure 6:
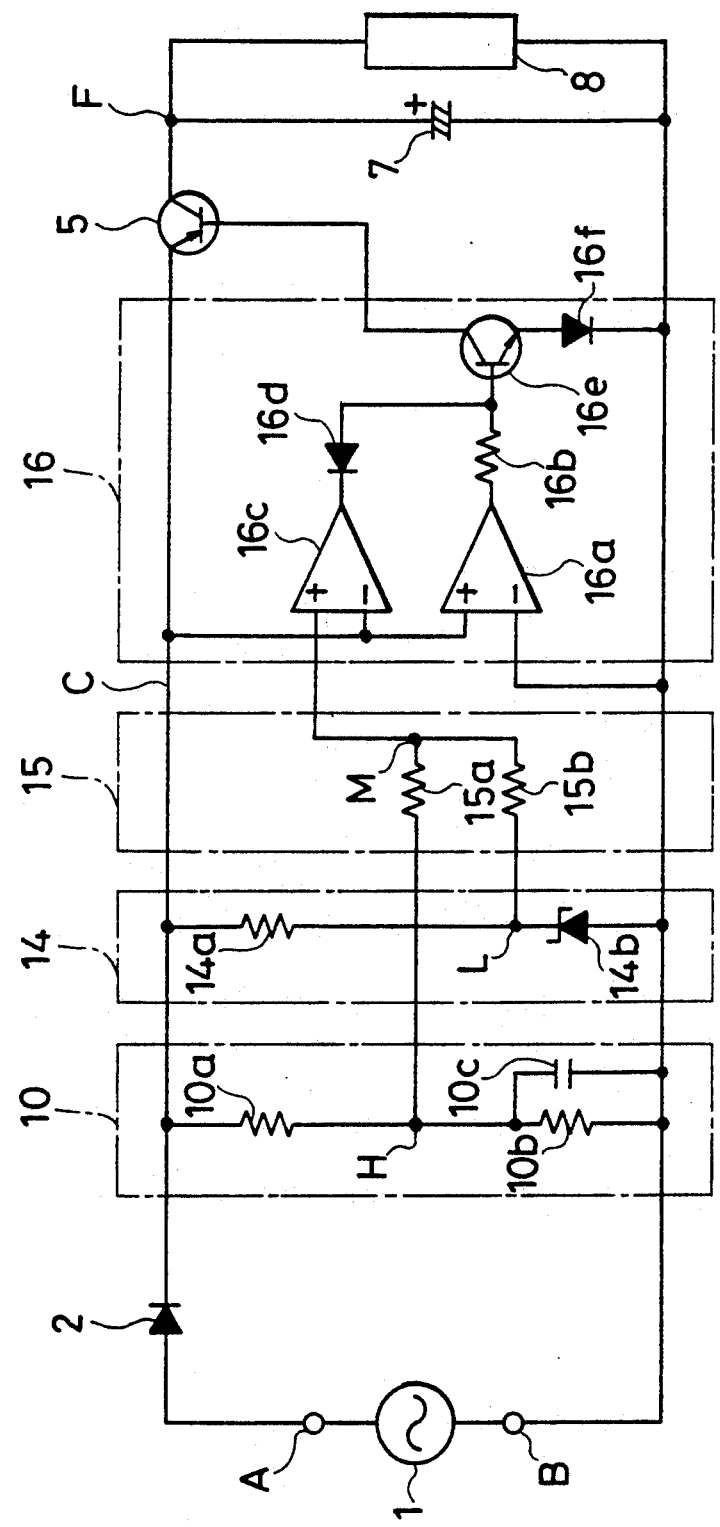
FIG. 6 is a circuit diagram showing a power-supply unit of the sixth embodiment in the present invention.

FIG. 6 is a circuit diagram showing a sixth embodiment of the present invention. Corresponding parts and components to the fifth embodiment are shown by the same numerals and marks, and the description thereon made in the fifth embodiment similarly applies. In FIG. 6, a first mixed voltage is zero volt. This is equivalent to the case that, in FIG. 5, an output voltage of the first phase-angle voltage generation circuit 9 and an output voltage of the first reference voltage generation circuit 12 are both zero volts. That is, the circuit of FIG. 6 is equivalent to the circuit of FIG. 5 in which the inverted terminal of the comparator 16a is connected to the terminal B of the A.C. power source 1. Operation of this sixth embodiment is similar to that of the fifth embodiment except that the first mixed voltage is zero volt.

As is apparent from the above-mentioned six embodiments, each of the first voltage and the second voltage can be given as one of the reference voltage (FIGS. 1 and 2), the phase-angle voltage (FIGS. 3 and 4) and the mixed voltage (FIGS. 5 and 6). Therefore, it is understood that nine combinations of circuits can be offered as shown in the following Table 1.

TABLE 1

| No. | First voltage | Second voltage | Note |
|---|---|---|---|
| 1 | Reference voltage | Reference voltage | FIGS. 1 and 2 |
| 2 | " | Phase-angle voltage | |
| 3 | " | Mixed voltage | |
| 4 | Phase-angle voltage | Reference voltage | |
| 5 | " | Phase-angle voltage | FIGS. 3 and 4 |
| 6 | " | Mixed voltage | |
| 7 | Mixed voltage | Reference voltage | |
| 8 | " | Phase-angle voltage | |
| 9 | " | Mixed voltage | FIGS. 5 and 6 |

Figure 7:
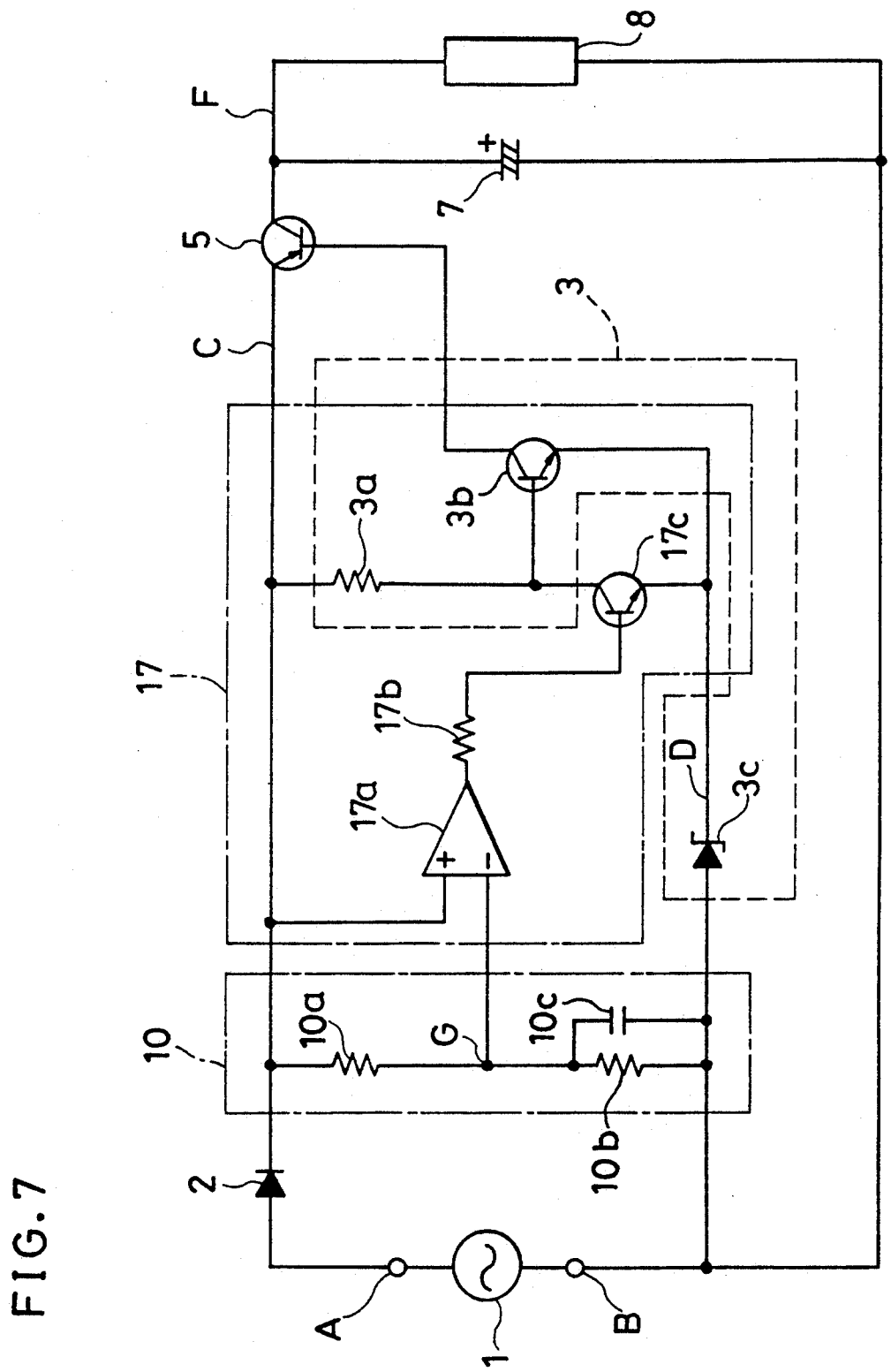
FIG. 7 is a circuit diagram showing a power-supply unit of the seventh embodiment in the present invention.

For example, the above No. 2 combination is described hereafter as the seventh embodiment. FIG. 7 is a circuit diagram showing a seventh embodiment. Corresponding parts and components to the aforementioned embodiments are shown by the same numerals and remarks, and the description thereon made in the aforementioned embodiments similarly applies. In this seventh embodiment, the first voltage is the reference voltage, and the second voltage is the phase-angle voltage. A control circuit 17 consists of a comparator 17a, resistors 17b, 3a and transistors 17c and 3b. The non-inverted terminal of the comparator 17a is connected to the line C, and the inverted terminal of the comparator 17a is connected to the output point G of the phase-angle voltage generation circuit 10. One end of the resistor 17b is connected to the output terminal of the comparator 17a, and the other end of the resistor 17b is connected to the base of the transistor 17c. The emitter of the transistor 17c is connected to an output point D of the reference voltage generation circuit 3. The control circuit 17 issues a control signal to the base of the transistor 5 from the collector of the transistor 3b.

Hereafter, operation of the seventh embodiment is described. In FIG. 7, when the voltage of the line C increases and reaches the reference voltage which is the operating voltage of the Zener diode 3c in the reference voltage generation circuit 3, current flows from the resistor 3a to the Zener diode 3c by way of the base and the emitter of the transistor 3b. Thus, the transistor 3b turns on, and a bias current is supplied to the base of the transistor 5. The transistor 5 thereby turns on. As a result, the capacitor 7 is charged with electricity, and electric power is supplied to the load at the same time. The phase-angle voltage generation circuit 10 generates the phase-angle voltage, which is in proportion to the output voltage of the rectifier 2 or the peak voltage of the A.C. power source, at the output point G. When the output voltage of the rectifier 2 becomes larger than the phase-angle voltage, the voltage inputted to the non-inverted input terminal of the comparator 17a is larger than the voltage inputted to the inverted input terminal. Therefore, the output voltage of the comparator 17 is of high level, and thereby the transistor 17c turns on. Then, current flows from the resistor 3a to the collector and the emitter of the transistor 17c. As a result, the collector voltage of the transistor 17c is substantially equal to the emitter voltage. The transistor 3b thereby turns off, and the bias current is not supplied to the base of the transistor 5. Thus, the transistor 5 turns off. When the output voltage of the rectifier 2 passes through the peak voltage and reaches the phase-angle voltage again, the transistor 5 turns on and keeps on-state until the output voltage of the rectifier 2 reaches the reference voltage. When the output voltage of the rectifier 2 decreases below the first reference voltage, the transistor 5 turns on. The above-mentioned operation is repeated to achieve a function of the power-supply unit.

Figure 8:
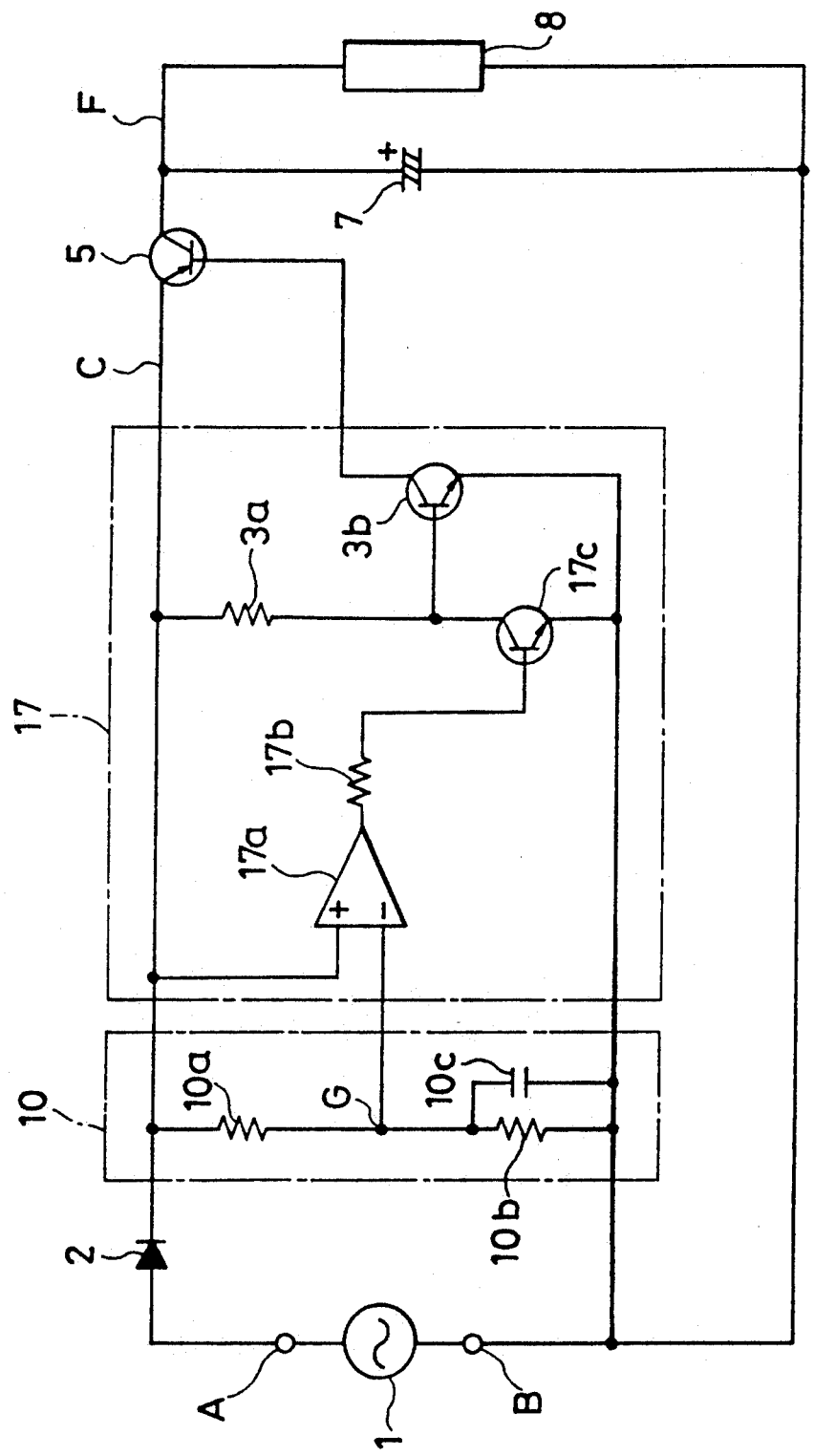
FIG. 8 is a circuit diagram showing a power-supply unit of the eight embodiment in the present invention.

Next, an eighth embodiment of the present invention is described. FIG. 8 is a circuit diagram showing the eighth embodiment. Corresponding parts and components to the seventh embodiment are shown by the same numerals and marks, and the description thereon made in the seventh embodiment similarly applies. In this eighth embodiment, the reference voltage is made zero volt, and therefore, the first voltage is zero volt. This is equivalent to the case that the anode and the cathode of the Zener diode 3c in FIG. 7 are shortcircuited each other. Operation of this eighth embodiment is therefore similar to the seventh embodiment except that the first (reference) voltage is zero volt.

Figure 9:
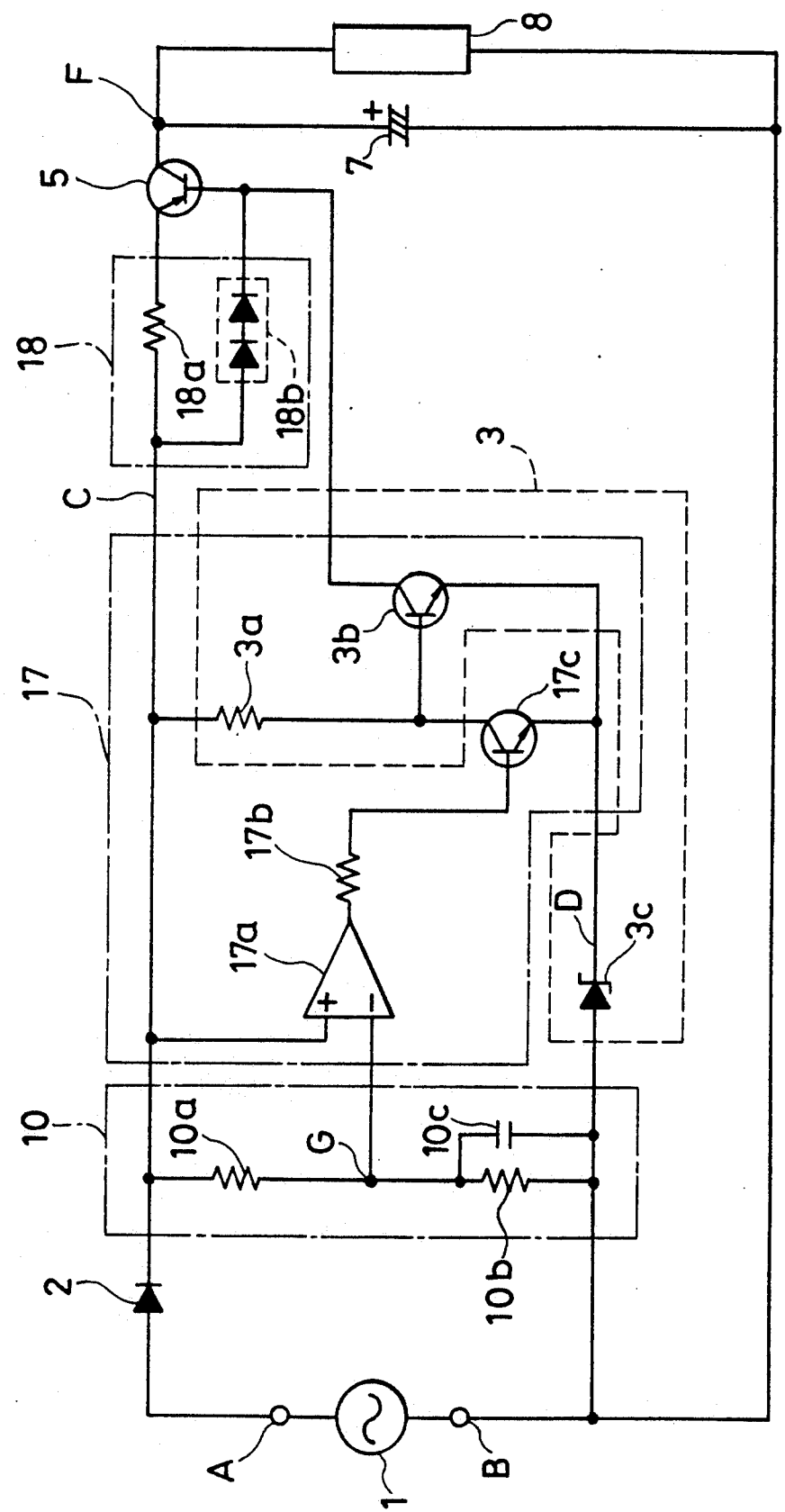
FIG. 9 is a circuit diagram showing a power-supply unit of the ninth embodiment in the present invention.
Figure 10:
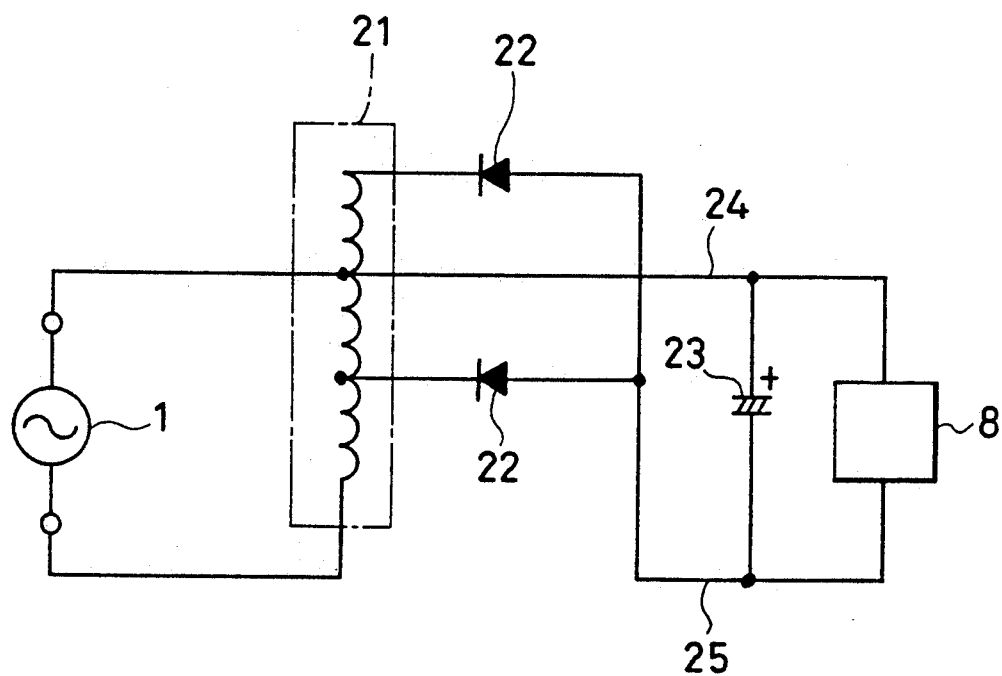
FIG. 10 is the circuit diagram showing the conventional power-supply unit.

Next, a ninth embodiment of the present invention is described. FIG. 9 is a circuit diagram showing the ninth embodiment. Corresponding parts and components to the seventh embodiment are shown by the same numerals and marks, and the description thereon made in the seventh embodiment similarly applies. A current limiting circuit 18 consists of a resistor 18a and a diode 18b. The resistor 18a is inserted between the emitter of the transistor 5 and the line C. The diode 18b is inserted between the base of th transistor 5 and the line C.

Hereafter, operation of the ninth embodiment is described. Operation for supplying the capacitor 7 and the load 8 with electric power is similar to the seventh embodiment. In this ninth embodiment, since the current limiting circuit 18 is provided in series to the transistor 5, it is possible to limit a current flowing through the transistor 5 to a predetermined value. When the transistor 5 is on, the base bias current flows, and the diode 18b is impressed with a voltage of approximately 1.2 volt. A voltage of approximately 0.6 volt is generated across the emitter and the base of the transistor 5. Therefore, a voltage of approximately 0.6 volt is applied to the resistor 18a. By changing a resistance of the resistor 18a, the current flowing through the transistor 5 can be easily adjusted. As a result, it is possible to use the transistor 5 and the capacitor 7 of small current capacity in comparison with those of the seventh embodiment (FIG. 7).

The above-mentioned current limiting circuit 18 can be applied to the aforementioned all embodiments in the similar way to this ninth embodiment.

In the above-mentioned all embodiments, each circuit of the power-supply units can be formed into an integrated circuit in order to reduce weight of the unit and minimize the size of unit.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A power-supply unit comprising:
   a rectifier circuit connected to an A.C. power source;
   switching means for opening/closing an electric line which supplies a load circuit with electric power from said A.C. power source via said rectifier circuit;
   a first reference voltage generation circuit for generating a first reference voltage based on an output voltage of said rectifier circuit, said first reference voltage generation circuit including a Zener diode for setting said first reference voltage;
   a second reference voltage generation circuit for generating a second reference voltage based on said output voltage and larger than said first reference voltage, said second reference voltage generation circuit including a Zener diode for setting said second reference voltage;
   a control circuit for turning said switching means on when said output voltage is in a range between said first reference voltage and said second reference voltage and turning said switching means off when said output voltage is outside said range; and
   a capacitor which is charged with electricity by said output voltage when said output voltage is in said range and supplies said load circuit with electric power when said output voltage is outside said range.

2. A power-supply unit comprising:
   a rectifier circuit connected to an A.C. power source;
   switching means for opening/closing an electric line which supplies a load circuit with electric power from said A.C. power source via said rectifier circuit;
a first phase-angle voltage generation circuit for generating a first phase-angle voltage which is based on an output voltage of said rectifier circuit and corresponding to a first phase-angle of said A.C. power source, said first phase-angle being a non-zero phase-angle;
a second phase-angle voltage generation circuit for generating a second phase-angle voltage which is based on said output voltage and corresponding to a second phase-angle of said A.C. power source larger than said first phase-angle;
a control circuit for turning said switching means on when said output voltage is in a range between said first phase-angle voltage and said second phase-angle voltage and turning said switching means off when said output voltage is outside said range; and
a capacitor which is charged with electricity by said output voltage when said output voltage is in said range and supplies said load circuit with electric power when said output voltage is outside said range.

3. A power-supply unit comprising:
a rectifier circuit connected to an A.C. power source;
switching means for opening/closing an electric line which supplies a load circuit with electric power from said A.C. power source via said rectifier circuit;
a first reference voltage generation circuit for generating a first reference voltage based on an output voltage of said rectifier circuit;
a second reference voltage generation circuit for generating a second reference voltage based on said output voltage and larger than said first reference voltage;
a first phase-angle voltage generation circuit for generating a first phase-angle voltage which is based on said output voltage and corresponding to a first phase-angle of said A.C. power source;
a second phase-angle voltage generation circuit for generating a second phase-angle voltage which is based on said output voltage and corresponding to a second phase-angle of said A.C. power source and which is larger than said first phase-angle;
a first mixing circuit for generating a first mixed voltage which is obtained by mixing said first reference voltage with said first phase-angle voltage by means of a first mixing ratio;
a second mixing circuit for generating a second mixed voltage which is obtained by mixing said second reference voltage with said second phase-angle voltage by means of a second mixing ratio;
a control circuit for turning said switching means on when said output voltage is in a range between said first mixed voltage and said second mixed voltage and making said switching means off when said output voltage is outside said range; and
a capacitor which is charged with electricity by said output voltage when said output voltage is in said range and supplies said load circuit with electric power when said output voltage is outside said range.

4. A power-supply unit in accordance with claim 3 further comprising:
a current limiting circuit connected in series to said switching means.

5. A power-supply unit comprising:
a rectifier circuit connected to an A.C. power source;
switching means for opening/closing an electric line which supplies a load circuit with electric power from said A.C. power source via said rectifier circuit;
a first phase-angle voltage generation circuit for generating a first phase-angle voltage which is based on an output voltage of said rectifier circuit and corresponding to a phase-angle of said A.C. power source, said first phase-angle remaining constant and independent of variations in said A.C. power source;
a second phase-angle voltage generation circuit for generating a second phase-angle voltage which is based on said output voltage and corresponding to a second phase-angle of said A.C. power source larger than said first phase-angle, said second phase-angle remaining constant and independent of variations in said A.C. power source;
a control circuit for making said switching means on when said output voltage is in a range between said first phase-angle voltage and said second phase-angle voltage and turning said switching means off when said output voltage is outside said range; and
a capacitor which is charged with electricity by said output voltage when said output voltage is in said range and supplies said load circuit with electric power when said output voltage is outside said range.

6. A power-supply unit according to claims 2 or 5, wherein said first phase-angle voltage generation circuit includes a first resistor connected in series with a second resistor and capacitor across said A.C. power source, said second resistor and capacitor are connected in parallel.

7. A power-supply unit according to claims 2 or 5, wherein said second phase-angle voltage generation circuit includes a first resistor connected in series with a second resistor and capacitor across said A.C. power source, said second resistor and capacitor are connected in parallel.

8. A power-supply unit according to claims 2 or 5, wherein said control circuit includes:
first comparator means for comparing said first phase-angle voltage with a reference voltage;
second comparator means for comparing said second phase-angle voltage with said reference voltage;
a diode having an anode and a cathode, said cathode connected to an output of said first comparator means;
a resistor having a first and second end, said first end connected to an output of said second comparator means, said second end connected to said anode; and
a transistor having an emitter, a collector, and a base, said base connected to said anode, said emitter connected to said A.C. power source, and said collector connected to said switching means.

9. A power-supply unit in accordance with any one of claims 1, 2 and 5 further comprising:
a current limiting circuit connected in series to said switching means.

10. A power-supply unit comprising:
a rectifier circuit connected to an A.C. power source;
switching means for opening/closing an electric line which supplies a load circuit with electric power from said A.C. power source via said rectifier circuit;

a first voltage generation circuit for generating a first voltage based on an output voltage of said rectifier circuit, said first voltage being a non-zero voltage;

a second voltage generation circuit for generating a second voltage based on said output voltage and larger than said first voltage;

a control circuit for turning said switching means on when said output voltage is in a range between said first voltage and said second voltage and turning said switching means off when said output voltage is outside said range;

a capacitor which is charged with electricity by said output voltage when said output voltage is in said range and supplies said load circuit with electric power when said output voltage is outside said range; and wherein said first voltage generation circuit includes a first Zener diode, a resistor and a second Zener diode connected in series across said A.C. power source.

11. A power-supply unit comprising:

a rectifier circuit connected to an A.C. power source;

switching means for opening/closing an electric line which supplies a load circuit with electric power from said A.C. power source via said rectifier circuit;

a first voltage generation circuit for generating a first voltage based on an output voltage of said rectifier circuit, said first voltage being a non-zero voltage;

a second voltage generation circuit for generating a second voltage based on said output voltage and larger than said first voltage;

a control circuit for turning said switching means on when said output voltage is in a range between said first voltage and said second voltage and turning said switching means off when said output voltage is outside said range;

a capacitor which is charged with electricity by said output voltage when said output voltage is in said range and supplies said load circuit with electric power when said output voltage is outside said range; and wherein said second voltage generation circuit includes:

a transistor having an emitter, a base and a collector;

a resistor connected to said base; and a Zener diode connected to said collector.

* * * * *

UNITED STATES PATENT AND TRADEMARK OFFICE
CERTIFICATE OF CORRECTION

PATENT NO.   : 5,307,257

DATED        : April 26, 1994

INVENTOR(S)  : FUKUSHIMA, Yoshio

It is certified that error appears in the above-identified patent and that said Letters Patent is hereby corrected as shown below:

ON THE TITLE PAGE:

[22] change "1993" to --1992--.

Signed and Sealed this

First Day of August, 1995

Attest:

BRUCE LEHMAN

Attesting Officer

Commissioner of Patents and Trademarks